United States Patent [19]
Bandelin et al.

[11] Patent Number: 5,948,287
[45] Date of Patent: Sep. 7, 1999

[54] PROCESS FOR THE PRODUCTION OF MASK FRAMES

[75] Inventors: Gerd Bandelin; Gunter Heine; Young-Kwan Kim, all of Berlin, Germany

[73] Assignee: Samsung Display Devices Co., Ltd., Kyungki-do, Rep. of Korea

[21] Appl. No.: 08/906,431

[22] Filed: Aug. 5, 1997

[30] Foreign Application Priority Data

Aug. 5, 1996 [DE] Germany .............................. 196 32 415

[51] Int. Cl.[6] .................................................. B23K 26/00
[52] U.S. Cl. ...................................................... 219/121.64
[58] Field of Search ........................ 219/121.63, 121.64; 445/30, 47; 313/402, 407

[56] References Cited

U.S. PATENT DOCUMENTS

| | | | |
|---|---|---|---|
| 3,516,147 | 6/1970 | Seedorff et al. | 228/173.6 |
| 3,792,522 | 2/1974 | Gray et al. | 228/142 |
| 3,942,064 | 3/1976 | Dimmick et al. | 313/407 |
| 4,828,523 | 5/1989 | Fendley et al. | 219/121.63 |
| 5,013,275 | 5/1991 | Kautz | 445/30 |
| 5,347,528 | 9/1994 | Harata | 219/121.64 |
| 5,618,453 | 4/1997 | La Rocca | 219/121.64 |

FOREIGN PATENT DOCUMENTS

| | | |
|---|---|---|
| 988141 | 4/1976 | Canada . |
| 1272966 | 7/1968 | Germany . |
| 3832772 | 4/1989 | Germany . |
| 3-114118 | 5/1991 | Japan . |
| 6-150813 | 5/1994 | Japan . |

*Primary Examiner*—Geoffrey S. Evans
*Attorney, Agent, or Firm*—Leydig, Voit & Mayer, Ltd.

[57] ABSTRACT

A process for the production of mask frames for cathode ray tubes and is particularly useful in the production of color picture tubes for TV sets and monitors. The production of the frames is performed by welding at least two starting components, followed by forming, wherein planar starting components are positioned and fixed in positions in such way that edges of the starting components to be welded are in contact, followed by welding the starting components with at least one laser beam and, subsequently, processing the frame by pressing and/or punching. Preferably the laser beam is generated using a $CO_2$ gas laser or a Nd:YAG solid-state laser. Preferably, the power of the laser beam is modulated to produce a weld that increases in depth from the beginning of the weld and decreases in depth at the end of the weld.

9 Claims, 2 Drawing Sheets

PROCESS FOR THE PRODUCTION OF MASK FRAMES

The invention relates to a process for the production of mask frames for cathode ray tubes and is particularly useful in the production of color picture tubes for TV sets and monitors.

BACKGROUND OF THE INVENTION

Mask frames may be produced as a single piece punched from a steel band. On a first press, a plate is punched out from the steel band, the outer contour of which corresponds to the subsequent mask frame. From that plate, the mask frame is formed in another press. In a third step, the interior portion is punched out. The inner edge of the mask frame is flanged in a fourth step.

This punching method is disadvantageous because the interior portion of the steel band is not used. If the inner area, due to its small size, cannot be used for smaller mask frames, this material will be wasted, increasing the cost of manufacture.

Furthermore, it is already common practice to assemble a mask frame from multiple individual starting components by welding overlapping portions of the starting components. To this end, one or more band components are cut to proper lengths, for example. The ends of the components are overlapped and are welded together so that, in principle, a closed ring of metal band is formed. The required band width corresponds to the subsequent form of the mask frame. After welding, the ring is further processed using a punching technique.

The precondition of another familiar variant is that components with short limbs and of distinct shape, in the form of the Latin character U, for example, are punched in pairs. These parts are welded in an overlapping manner and then are further processed using a punching technique.

U.S. Pat. No. 3,516,147 describes bonding two components together by spot-welding. In U.S. Pat. No. 3,942,064, the overlapping ends of frame components a re welded together. The frame is assembled from both two and four components. Similarly,.the welding is carried out by spot welding.

Conventional welding procedures for producing mask frames are disadvantageous in that the bead of the weld seam which forms in both electric butt welding and pressure welding impedes the insertion of a welded mask frame into a drawing tool. This necessitates grinding or planing the protruding weld seams which, in turn, is quite time-consuming and limits automation in mask frame production. Also, pressure welding results in high energy consumption and increases the operating expenses in mask frame production.

SUMMARY OF THE INVENTION

One object of the invention relates to a process for producing mask frames for cathode ray tubes. Advantageously, this process may result in material, energy, and time savings. In addition, the process may be automated and can result in mask frames with consistently high quality.

A special advantage of the invention is that no overlappings and/or beads a reformed and the dimensions of the starting components and the raw frame may remain unchanged. This may be achieved by positioning and fixing flat plane-shaped starting components in such a way that the edges of the starting components can be welded into blunt contact. Also, the joints of the starting components can be welded with at least one laser beam. Subsequently, conventional processing of a raw frame having at least two weld seams by pressing or punching may occur.

The narrow heat affected zone in a laser welding process permits constant dimensions.

Another advantage of the invention is that the laser beam is generated by a $CO_2$ gas laser or a Nd:YAG solid-state laser, thereby permitting the selection and optimization of the most effective laser beam parameters (e.g., power, focussing etc.) and operating parameters (e.g., welding rate, inert gas, etc.,) for each application, depending on the material parameters.

BRIEF DESCRIPTION OF THE DRAWINGS

The invention will be illustrated in more detail with reference to the embodiments which, at least in part, are represented in the figures.

DETAILED DESCRIPTION

Figure 1:
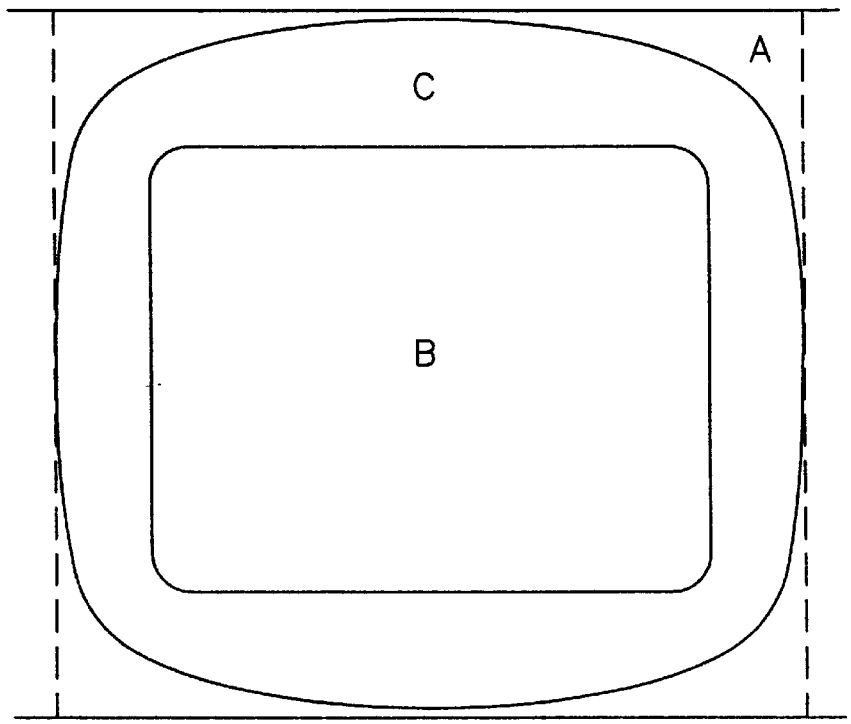
FIG. 1 shows a schematic representation of area partitions for the production of a mask frame.

As can be seen from FIG. 1, part C forms the raw frame to be processed. Parts A and B are not required in the further production of the mask frame.

Figure 2:
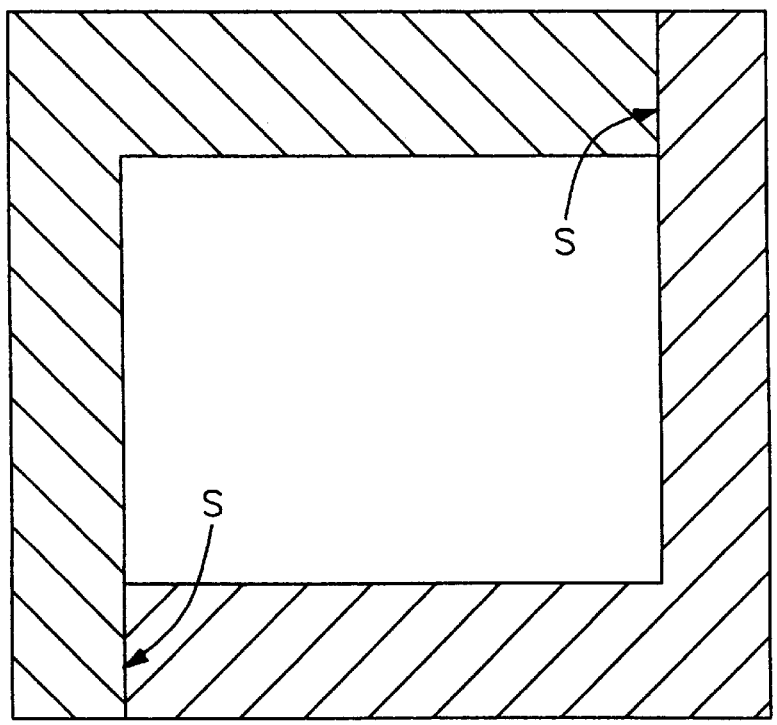
FIG. 2 shows a variant of obtaining a mask frame from two starting components.
Figure 3:
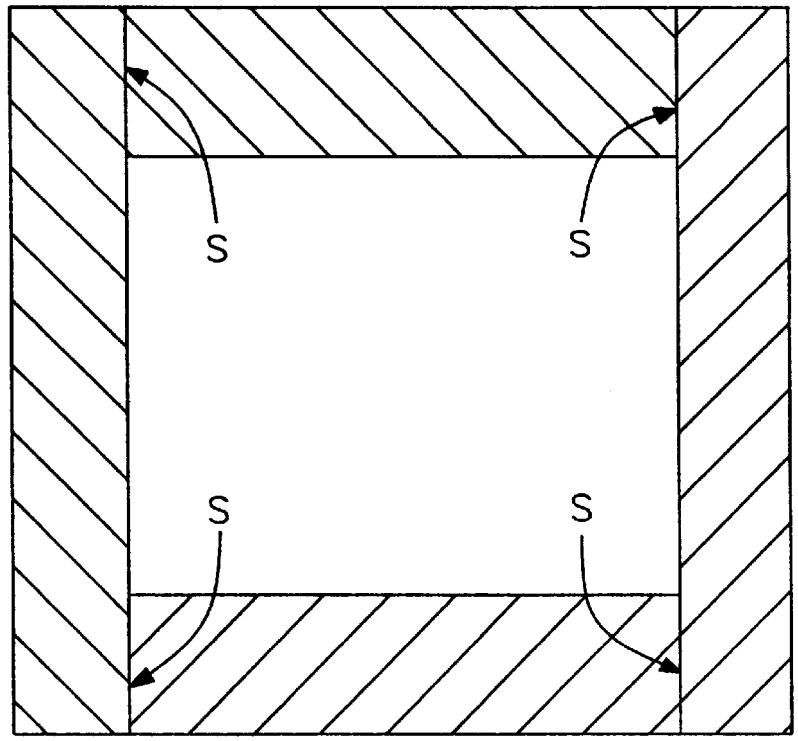
FIG. 3 shows a variant of obtaining a mask frame from four starting components.
Figure 4:
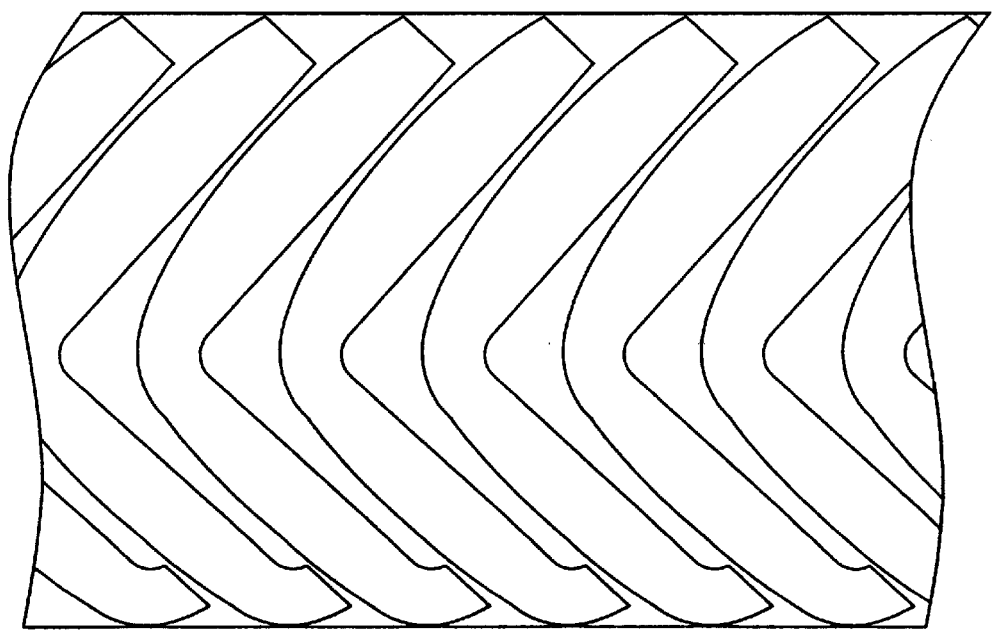
FIG. 4 shows a variant of designing and arranging the L-shaped starting components in the steel band.

In FIGS. 2 and 3 two different variants of mask raw frame production are represented, with FIG. 2 showing the production from two essentially L-shaped starting components and FIG. 3 showing the production from four essentially rectangular starting components. FIG. 4 represents the arrangement of the L-shaped starting components with optimized outer and inner contours.

The individual weld seams produced using the laser beams are designated S. A production process according to the invention will now be described.

Starting with a metal band (e.g., steel band), parts of a shape corresponding to the Latin character L as illustrated in FIG. 4 are punched out on a first press and are supplied to an automatic laser welding machine by means of a transfer system or a conveyor belt. Accurate positioning of the parts on the workpiece support is preferable during depositing. Preferably, the distance between parts to be welded is 0.1 mm at a maximum, and the misalignment is 0.6 mm at a maximum.

After welding the two parts (e.g., as illustrated in FIG. 2), the mask frame may be deep-drawn on a second press.

Instead of using L-shaped parts, it is also possible to assemble the raw frame for the mask frame using two long and two short rectangular bands and welding them together. This variant is illustrated in FIG. 3. However, this may double the number of weld seams S and weld seams L and may increase the welding time.

To obtain welds, a welding apparatus, which preferably comprises a $CO_2$ high performance laser or a Nd-YAG laser is used.

Both lasers may have an interface for controlling to permit external programming and determination of the laser power cycles, pulse programs, pulse frequency and laser power. In analog laser power controlling which is controlled directly by the CNC (computerized numerical control), one has the ability to control the laser power's path-dependency, rate-dependency, time-dependency or in the form of laser power levels.

When using a $CO_2$ laser, the laser beam may be transmitted to the working head by means of mirror optics. Preferably, the workpiece is immobile.

When laser welding using the $CO_2$ laser, for example, a welding head with a mirror focusing head having a focal distance of from 150 to 200 mm may be used as the focusing optics. With the $CO_2$ laser, the beam is controlled by way of "flying optics" using a pentaaxial $CO_2$ laser processing station in a modular design, with DC servomotors being used as drivers, which are supplied by a transistor pulse regulator. The handling has three translational axes and two rotational axes in the form of a tilt-swivel table system.

In particular, the maximum achievable welding rate in sheet welding depends on the maximum laser power applied to the workpiece, the working optics adjustment as well as the sheet type (e.g., material) and sheet thickness.

Favoring the use of a $CO_2$ laser are higher efficiency, lower initial costs per output unit, lower expenses for laser and equipment safety, easier power control and superior beam quality. Factors against the use of a $CO_2$ laser include: poor transmittance of the laser power by an optical waveguide, complicated beam transmittance for 3D processing, inferior interaction (e.g., absorption) with certain materials, larger dimensions of equipment, costly optics, higher expenses for maintenance, and higher operating expenses.

When using Nd:YAG solid-state lasers, in addition to the parameters already mentioned for the $CO_2$ laser, the mode of operation may be important in order to achieve maximum possible welding rates. Since coupling of the laser beam is better in pulse operation than in CW (continuous wave) operation, an increase in rates can be achieved. With the high performance solid-state laser, the Nd:YAG laser radiation can be transmitted by way of, for example, an optical fiber cable. Focusing in this solid-state laser is carried out by using a lens system. A hex-axial anthropomorphic robot may be used as a handling system for the high performance solid-state laser.

A clamping device may be used to fix the workpieces when preparing the laser welding. Preferably a welding gap does not exceed a gap width of 0.1 mm.

As a further tolerance criterion, the permissible misalignment of the starting components to be welded preferably ranges from 0 to 0.6 mm. The starting components may be arranged in the clamping device with the shear burr upwards. Process gas may be supplied coaxially to the laser beam through the operating optics and the gas nozzle. Since the rear beam path is sealed by the focusing lens of the operating optics, the process gas is allowed to emerge only from the nozzle directly onto the workpiece. The gas flow level may be adjusted, measured and maintained constant by means of a precision rotameter. Argon or nitrogen may be used as process gases.

Due to the melt flow of the frame material during laser welding, notches may form at the beginning and at the end of the seam. Notch forming can be minimized through process control, e. g., by special control of the beam power or the rates.

The invention is not limited to the embodiments illustrated herein. Rather, by combining and modifying the above-mentioned means and features, other variants of embodiments may be obtained without departing from the scope of the invention.

We claim:

1. A process for producing mask frames for cathode ray tubes by welding at least two starting components and subsequently forming by deep-drawing, the process comprising:

fixing two planar starting components in fixed positions so that edges of the two starting components to be welded together are in contact, laser welding the starting components at the edges with at least one laser beam to produce a frame, including modulating the power of the laser beam to produce a weld of the two starting components that increases in depth from the beginning of the weld and decreases in depth at the end of the weld, and deep drawing the frame produced by the laser welding.

2. The process of claim 1 including welding with a $CO_2$ gas laser or a Nd:YAG solid-state laser.

3. The process according to claim 2, including generating the laser beam with a Nd:YAG solid-state laser, transmitting the laser beam by means of a laser optical waveguide, and focusing the laser beam using a lens system.

4. The process according to claim 2 including laser welding with a $CO_2$ gas laser, optically adjusting the laser beam using mirror optics, and focussing the laser beam.

5. The process of claim 1 wherein a distance between the edges to be welded ranges from 0 to about 0.1 mm, and wherein a misalignment of the edges ranges from 0 to about 0.6 mm.

6. The process of claim 1 including laser welding in the absence of an inert gas.

7. The process according to claim 1, wherein the starting components are essentially L-shaped steel band punched parts with form-specific outer and inner contours.

8. The process of claim 1 including supplying an inert gas during the laser welding.

9. The process of claim 8 wherein the inert gas is selected from the group consisting of argon, nitrogen, and mixtures thereof.

* * * * *